United States Patent [19]

Keith

[11] Patent Number: 4,472,858

[45] Date of Patent: Sep. 25, 1984

[54] GUIDE AND CUTTER DEPTH CONTROL APPARATUS

[75] Inventor: Jon T. Keith, Wheeling, Ill.

[73] Assignee: Gregor Jonsson Associates, Inc., Highland Park, Ill.

[21] Appl. No.: 403,127

[22] Filed: Jul. 29, 1982

[51] Int. Cl.³ .......................................... A22C 29/02
[52] U.S. Cl. ...................................................... 17/72
[58] Field of Search ................. 17/71, 72, 73, 49, 53, 17/61, 55, 52; 83/382, 456, 466, 733

[56] References Cited

U.S. PATENT DOCUMENTS 2,750,623 6/1956 Baader ............................. 17/56 X
2,913,759 11/1959 Evich ................................ 17/61 X
3,122,777 3/1964 Jonsson ................................. 17/72

*Primary Examiner*—Willie G. Abercrombie
*Attorney, Agent, or Firm*—Marshall, O'Toole, Gerstein, Murray & Bicknell

[57] ABSTRACT

A guide and cutting assembly for shrimp processing equipment in which a rotary cutting blade is adjustably positioned to enter a slot in a biased guide means. The guide means includes a one-piece guide bar having a pair of spaced guide legs each having tapered guide surfaces. A cam means is utilized to space the rotary cutting blade relative to the guide bar whereby the depth of cut in a shrimp is selectively determined.

10 Claims, 7 Drawing Figures

GUIDE AND CUTTER DEPTH CONTROL APPARATUS

The invention disclosed and claimed herein relates to a new, improved and unobvious guide and cutting assembly utilized with shrimp processing production equipment and more particularly to an improved guide and cutting blade adjustment assembly which serves to orient and maintain a workpiece such as shrimp in a desired position as it passes through a cutting station where the shrimp is cut to a desired depth with the vein of the shrimp being exposed for subsequent removal.

BACKGROUND OF THE INVENTION

There are a number of production machines presently utilized in the shrimp processing industry which serve to process shrimp. In a production operation, as contrasted to a hand operation where a shrimp is cleaned, cut and peeled by hand, shrimp normally are transported to various stations where they are cleaned, cut and the shell and sand vein removed. The processing equipment includes means for adjusting a particular operation such as adjusting the cutting blade depth which controls the depth of cut that is made in a shrimp along its longitudinal axis. Equipment employed in shrimp processing operations are illustrated, for example, in U.S. Pat. Nos. 2,784,540; 2,850,761; 3,122,777; 3,159,871; 3,566,437 and 3,751,766.

While the equipment available to process shrimp on a production basis has been highly satisfactory, it has been found that a problem sometimes exists in that the shrimp being processed are not oriented properly relative to a shrimp cutting station where the shrimp shell and meat normally are cut by a rotating cutting blade and the vein of the shrimp is exposed for subsequent removal in the processing operation. It is imperative in substantially all shrimp processing operations that a shrimp be properly oriented relative to the cutting blade in order that the shrimp be cut substantially along its length to expose the sand vein. Failure to expose the shrimp vein creates a number of problems. Initially, if a shrimp is cut and the vein is not exposed, the vein cannot be removed subsequent processing operations. If the vein is not removed, the overall quality and value of the shrimp product is reduced substantially. Similarly, should the vein be removed by way of an additional hand or machine cutting operation which further cuts the shrimp to expose the vein, the overall shrimp processing costs are increased and often the shrimp's market value is decreased due to the additional cut made to expose the vein. The net effect is that the inability to cut a shrimp to achieve vein exposure often serves as the cause for removing a processed shrimp from a "premium" type category to one of reduced quality and value.

What is desired is a guide and cutting assembly for use with shrimp processing equipment which serves to orient and guide a shrimp through a shrimp cutting station so that a shrimp can be cut at the desired depth along its length and the shrimp vein exposed. While guide systems are available for guiding shrimp as it is transported through a cutting station, it has been found that the guide systems sometimes fail to provide consistent positioning of the shrimp relative to the cutting blade such that the shrimp vein is not exposed for removal. It also has been found that guide systems presently available will, over a period of time, sometimes fail to orient and maintain the shrimp in proper position as the shrimp is transported through the cutting station due to the guide system components becoming loose or bent. Accordingly, what is also desired is a guide and cutting assembly which will serve to properly orient and maintain the shrimp in proper position during the cutting operation over an extended period of time so that the desired depth of cut can be made along the longitudinal axis of the shrimp to at least expose the shrimp vein.

SUMMARY OF THE INVENTION

The invention disclosed and claimed herein serves to minimize problems found with shrimp guide and cutting systems presently available. The guide assembly of the present invention guides and aligns the shrimp as it is transported through the shrimp cutting station where a shrimp is cut by a rotary cutting blade which cuts at least the shrimp shell and meat to expose the vein. The guide assembly is biased so that it is urged against the shrimp located on the shrimp transport means which transports shrimp from one processing station to another. Additionally, an improved cutting blade adjustment means for adjustably positioning a shrimp cutting blade relative to the guide means of the present invention is also provided.

Briefly, the present invention includes a one-piece guide bar assembly which depends from and is rotatable about a fixed shaft. The guide bar assembly is fastened to a spring means which serves to urge a shrimp guide bar toward the shrimp transport means so that a positive pressure is applied to a shrimp along its length as the shrimp passes through the shrimp cutting station. The guide bar includes a pair of spaced legs having tapered surfaces which assist in guiding the shrimp as it travels through the shrimp cutting station.

A cutting blade assembly is journaled in an arm which depends from the fixed shaft which supports the guide bar assembly. A cutting blade adjustment assembly also is connected to the arm and includes a cam which can be adjusted to permit the cutting blade to be adjustably positioned relative to the guide bar assembly whereby the desired shrimp cutting depth is selected.

These and other advantages will become more apparent from a further understanding of the drawings and detailed description.

DETAILED DESCRIPTION

Figure 1:
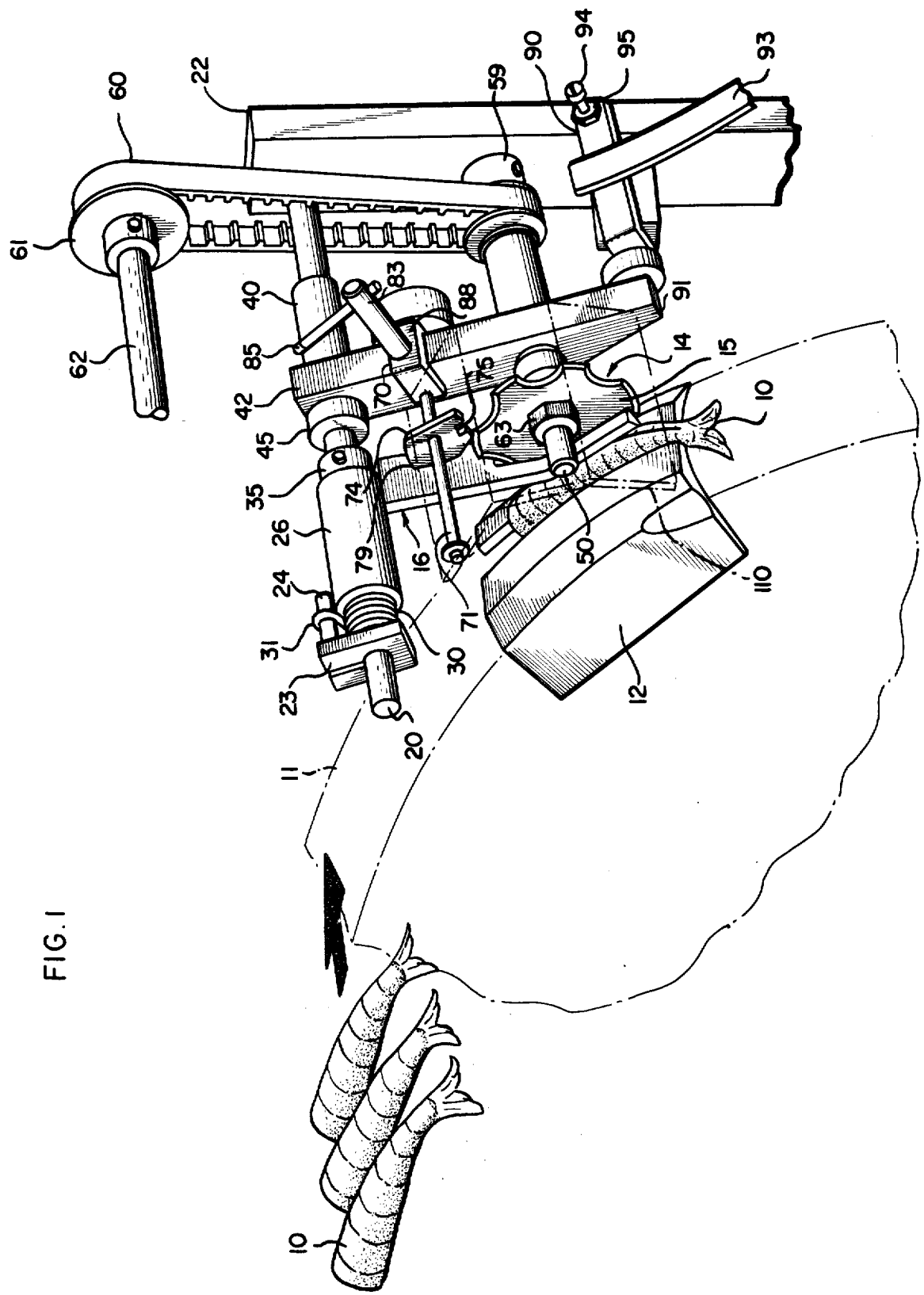
FIG. 1 shows a perspective view of the guide and cutting assembly of the present invention positioned relative to a shrimp transport means.

Referring to the drawings and more particularly FIG. 1, there is shown a number of shrimp 10 which are conveyed by suitable conveyor means, not shown, to a transport means 11 shown in schematic which transports the shrimp 10 to be processed to a plurality of work stations where various operations are performed upon the shrimp. Normally, a shrimp 10 is held in position by a clamping device 12 which is fastened to the transport means. The utilization of shrimp conveying and transport is described in greater detail, for example, in U.S. Pat. No. 3,247,542 entitled "Machine for Cleaning Shrimp."

Figure 4:
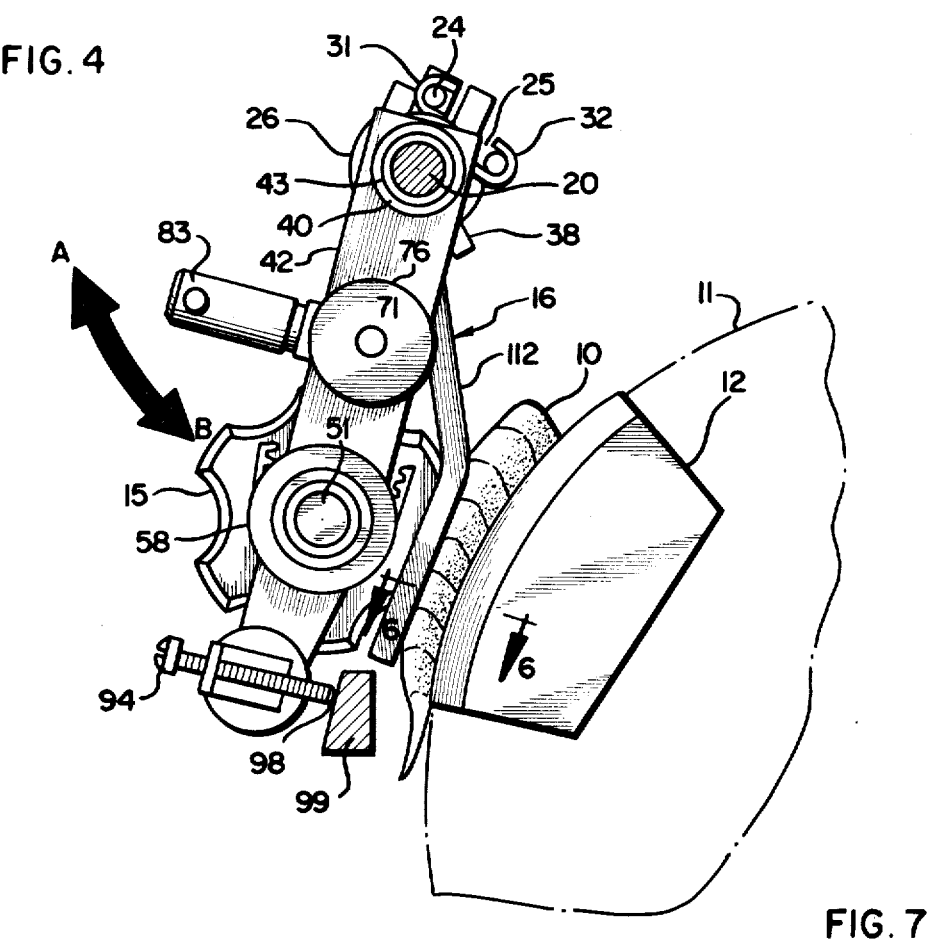
FIG. 4 shows a fragmentary section view taken along lines 4—4 in FIG. 2.
Figure 5:
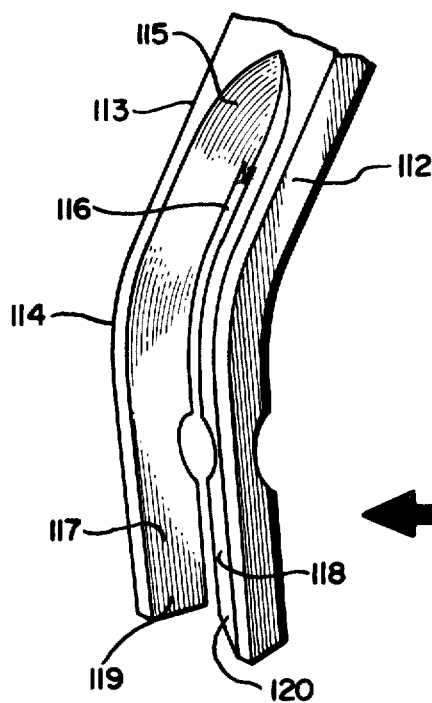
FIG. 5 shows a fragmentary, perspective view of the shrimp guide bar of the present invention.
Figure 6:
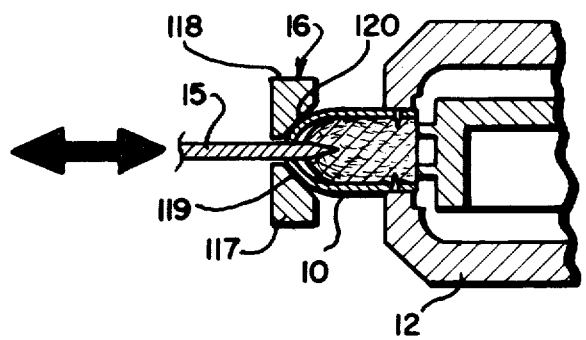
FIG. 6 shows a fragmentary section view taken along lines 6—6 in FIG. 4 showing a blade cutting the shell and meat of a shrimp which is held in position by the guide bar legs of the present invention and a shrimp clamping device located on the shrimp transport means; and, FIG. 7 shows a fragmentary view of a second embodiment of a cam member disposed on a cam support shaft utilized in connection with the cutting blade depth adjustment control means of the present invention.

Shrimp 10 is transported to cutting station 14 where cutting blade 15 cuts the shrimp to a predetermined depth as illustrated in FIGS. 1, 4 and 6. As the shrimp approaches cutting station 14, the shrimp initially engages a shrimp guide assembly 16 which guides and maintains shrimp 10 in proper position as the shrimp travels through station 14 where the shrimp is cut to at least a depth which exposes the sand vein which then can be removed at a subsequent work station.

Referring to FIGS. 1-5 inclusive, shaft 20 is fixed to suitable frame supports 21, 22. Block 23 is clamped to shaft 20 by suitable screw means 19. A first anchor stud 24 extends outward from clamp block 23. A second anchor stud 25 extends outward from and is fixed to bearing bushing 26 which is rotatable about shaft 20. Torsion spring 30 has one end 31 attached to the first anchor stud 24 while the remaining spring end 32 is attached to the second anchor stud 25 thereby serving as spring means for biasing bushing 26 on shaft 20.

A first stop collar 35 is keyed to shaft 20 and is held in fixed position by fastening screw 36. A guide bar stop 38 (FIG. 2) is fixed to and depends from collar 35.

Bearing bushing 40, which is rotatable about shaft 20, is fixed at end 41 to rotatable arm 42 which extends radially from shaft 20. Washer 43 is positioned adjacent one end of bushing 40 and washer 44 is located adjacent arm 42. Collar 45 is clamped in a fixed position on shaft 20 by means of clamping screw 46 while a conventional E-ring is inserted in a suitable groove, not shown, in shaft 20 adjacent washer 43. The collar 45 and the E ring serve to position arm 42 in a fixed position on shaft 20. It is appreciated that other suitable fastening means and arrangements could be utilized by one skilled in the art to position arm 42 and bearing bushing 26 on shaft 20.

Cutting assembly 50 is connected to arm 42. Rotatable shaft 51 passes through a first bushing sleeve 52 which is disposed in a bore in arm 42. End 53 of bushing 54 is welded or otherwise attached to arm 42. A second bushing sleeve 55 is disposed in bushing 54. Collar 56 fixed on shaft 51 by collar screw 57 is located adjacent sleeve 52 while pulley 58 is fixed to shaft 51 adjacent second sleeve 55 by means of clamping screw 59. Belt 60 connects pulley 58 and pulley 61 (FIG. 1) located on drive shaft 62. Actuation of drive shaft 62 causes rotation of shaft 51 and rotary cutting blade 15 which is fastened to shaft 51 by means of nuts 62, 63.

Figure 2:
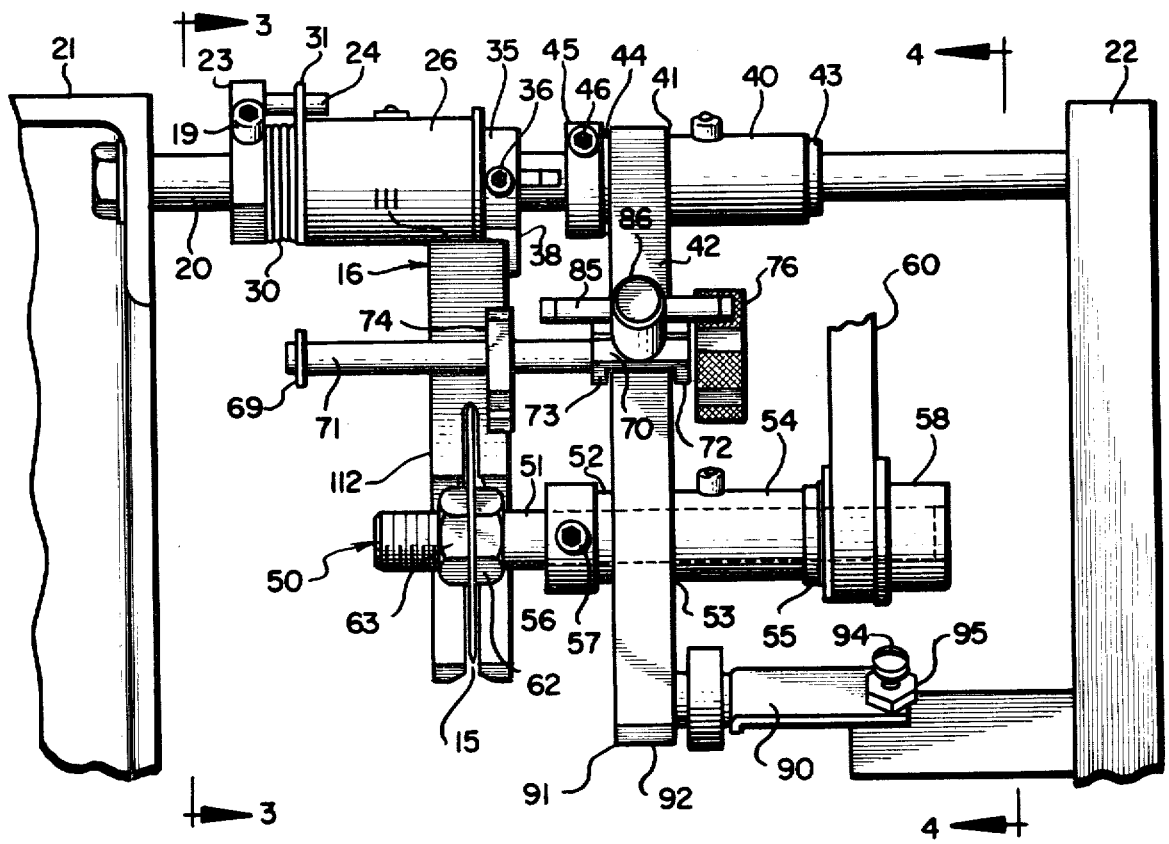
FIG. 2 shows a fragmentary front view of the guide and cutting assembly of FIG. 1.
Figure 3:
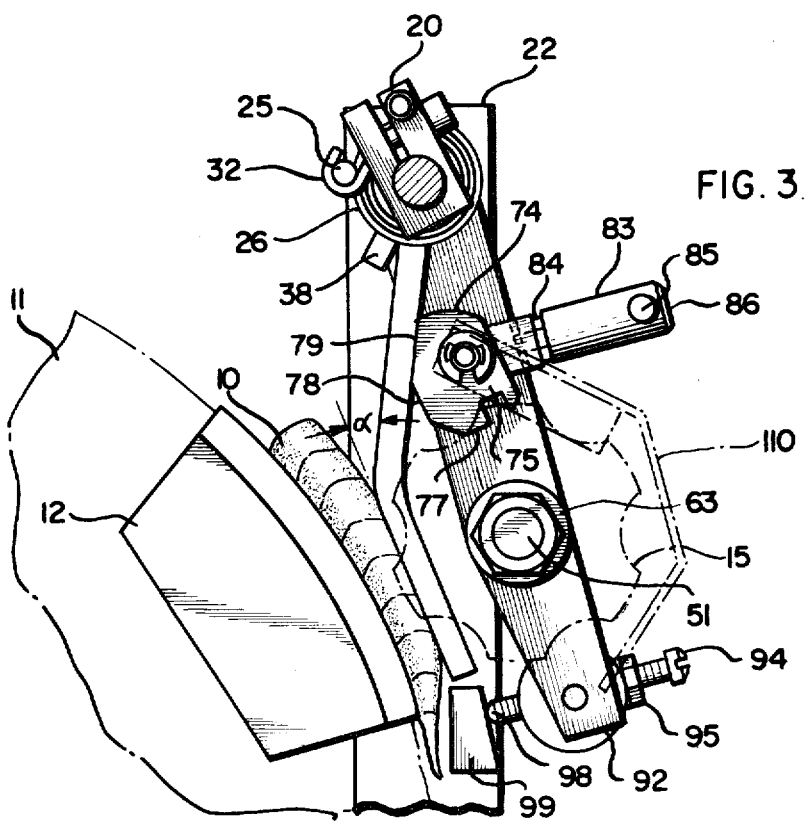
FIG. 3 shows a fragmentary section view taken along lines 3—3 in FIG. 2.

Yoke 70 is positioned on arm 42 between shafts 20 and 51. A cam support shaft 71 passes through a bore in arm 42 and yoke legs 72, 73 as shown in FIGS. 1, 2 and 3. Cam 74 having a plurality of flat cam surfaces such as 77, 78, 79, is fixed to shaft 71 by means of cam screw 75.

A knurled adjustment knob 76 is fixed by suitable fastening means to one end of cam support shaft 71. Rotation of knob 76 causes rotation of shaft 71 and cam 74 whereby a desired cam surface such as 77, 78, 79 is rotated relative to guide bar 112 whereby, depending upon the particular cam surface selected, cutting blade 15 extends a desired depth through slot 116 in guide bar 112.

Stud 83 threaded at one end 84 passes through a bore in yoke base 88 and is screwed into a threaded opening in arm 42. A tee-handle 85 extends through stud 83 adjacent the remaining stud end 86. As stud 83 is threaded inwardly it draws yoke legs 72, 73 against cam support shaft 71 sufficiently to preclude shaft 51 from rotation whereby the shaft and cam 74 are locked in position.

Turning to the outboard end 92 of arm 42, arm 90 is connected to and extends outward from arm 42. Leaf spring 93 is adapted to seat against arm 90 as illustrated in FIG. 1 and serves to urge arm 42 in a direction toward shrimp transport means 11. Screw 94 is threaded through arm 90 and is locked in a desired position by lock nut 95 whereby screw end 98 is adapted to seat against fixed surface 99. Adjustment of screw 94 relative to fixed surface 99 limits the rotational movement of arm 42 and cutting assembly 14 about shaft 20 as arm 42 is urged toward shrimp transport means 11 by leaf spring 93. Leaf spring 93 and screw adjustment means 94 are utilized on shrimp processing equipment presently available and are disclosed herein for the purpose of showing their relationship to the cutting blade adjustment means on shaft 71.

Referring to FIGS. 1 and 2, guide bar 112 is fixed at end 111 to bearing support bushing 26 and extends radially outward from the bushing. Bar 112 includes a first portion 113 and a curved second portion 114 angularly disposed to first portion 113 at an angle a of approximately 30°. As seen more clearly in FIG. 5, portions 113, 114 are grooved at 115 and slotted at 116 to form a pair of spaced guide legs 117, 118 having tapered surfaces 119, 120 respectively. Guide bar 112 preferably comprises a one piece member and is made of stainless steel or other suitable substantially rigid material. Bar 112 being fixed to spring biased bushing 26, is adapted to be urged in the direction from "A" to "B" shown by the arrows in FIG. 4. Guide bar 112 is limited in its movement in the direction shown by arrow B in FIG. 4 by stop bar 38 which is fixed to collar 35. When guide bar 112 is urged in the direction shown by arrow A in FIG. 4, cutting blade 15 will be urged in that direction inasmuch as cam 74 rests against guide bar 112.

Figure 7:
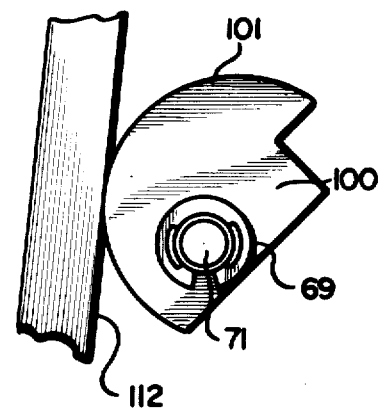

One embodiment of a cam has been shown in FIGS. 1-3, where cam 74 includes a plurality of flat surfaces 77, 78, 79. If desired, the cam embodiment shown in FIG. 7 could be utilized. In this alternative embodiment, curved cam surface 101 has been generated. Cam 100 can be fixed to shaft 71 in place of cam 74 and the desired cutting blade depth 15 can be selected by merely turning cam 100 to select the particular cam surface portion which is to rest against guide bar 112.

Depending upon the particular depth of cut to be made upon a shrimp, cutting blade adjustment knob 76 is rotated to a desired position. This permits a particular cam surface on cam 74 or 100 to be positioned relative to guide bar 112 so that the depth to which cutting blade 15 is to extend through slot 116 in guide bar 112 is selected. Tee handle 85 is then turned to lock cam support shaft 71 in fixed position or arm 42.

In operation, a shrimp 10 held in clamp 12, is transported on transport means 11 to cutting station 14. The tail of a shrimp to be processed initially contacts guide bar 112 and engages the grooved guide legs 117, 118. As the shrimp travels through cutting station 14, it is held in position by tapered guide leg surfaces 119, 120. Guide bar 112, which is urged against the shrimp by torsion spring 30, also serves to maintain the shrimp in the desired position as it travels through cutting station 14 where the desired depth of cut is made by cutting blade 15 along the length of the shrimp as shown in FIGS. 1, 4 and 6. Accordingly, the guide bar assembly and cutting blade adjustment means of the present invention permit shrimp to be guided through the cutting station where the shrimp is cut to a desired depth and the vein of the shrimp is exposed.

A shield 110 is shown in shaded lines in FIGS. 1 and 3. This is a conventional shield employed for safety purposes and it is normally positioned adjacent cutting blade 15 to shield the blade from a machine operator. The shield can be attached to cam shaft 71 by any suitable means.

It will be understood that the invention disclosed and claimed herein can be embodied in modified forms, and is not limited to the exact details as shown and described.

What is claimed:

1. A guide and cutting blade assembly for use with processing equipment which transports shrimp or other material to be processed through a cutting station, said assembly includes:

a first fixed shaft;

a rotatable arm depending from said first fixed shaft;

a second rotatable shaft connected to said arm and having a rotary cutting blade fixed thereto;

a guide means for guiding a shrimp to be processed through said cutting station, said guide means depending from a biased rotatable member connected to said first fixed shaft;

said guide means including a substantially rigid guide bar having a slot for receiving said cutting blade; and, an adjustment means for adjusting the depth said cutter blade extends into said guide bar slot;

said adjustment means being connected to said rotatable arm and including an adjustable cam means having a cam which bear against said guide means whereby the depth that said cutting means extends into the guide bar slot can be adjusted.

2. A guide and cutting blade assembly in accordance with claim 1 and further including a guideway located on said guide bar contiguous to said slot for receiving and guiding shrimp relative to said cutting blade as shrimp is transported through said cutting station.

3. A guide and cutting assembly in accordance with claim 1 wherein said adjustment means further includes a cam support shaft carried by said rotatable arm and said cam means is positioned on said cam support shaft; and, means for adjusting the position of said cam whereby the depth that said cutting blade is adjusted to enter said slot is selectively determined.

4. A guide and cutting blade assembly in accordance with claim 1 wherein said guide bar further comprises a first portion and a second portion angled relative to said first portion, at least one of said portions being slotted to receive said cutting blade and grooved along its length whereby a shrimp to be processed is adapted to seat against said grooved surface as a shrimp is transported through said cutting station.

5. A guide and cutting assembly in accordance with claim 4 wherein said guide bar is slotted and grooved to form a pair of spaced legs each having a tapered surface.

6. A guide and cutting blade assembly in accordance with claim 5 wherein said guide bar is a one-piece member.

7. A guide and cutting assembly in accordance with claim 5 and further including a guide bar stop means fixed to said first shaft for limiting rotation of said guide bar about said first shaft.

8. A guide and cutting assembly in accordance with claim 3 wherein said cam support shaft is disposed for rotation on said arm;

an adjusting knob fixed to said cam support shaft whereby rotation of said knob causes said shaft and cam to rotate so that a desired cam surface can be selected to contact said guide bar; and, means for locking said cam support shaft in a fixed position on said arm after a desired cam setting has been made.

9. A guide and cutting assembly in accordance with claim 8 wherein said locking means includes a yoke member having a base and a pair of spaced legs;

said cam support shaft extends through a bore in each of said legs and said arm; and means for drawing said cam support shaft against said yoke legs to lock said cam support shaft in fixed position.

10. A guide and cutting assembly in accordance with claim 9 wherein said yoke base has a bore and said locking means further comprises a stud member threaded at one end which is adapted to be inserted through said yoke base bore and threaded into a threading opening in said arm.

* * * * *